United States Patent
Kim

(10) Patent No.: US 10,693,122 B2
(45) Date of Patent: Jun. 23, 2020

(54) METHOD FOR PREPARING ELECTRODE SLURRY

(71) Applicant: LG CHEM, LTD., Seoul (KR)

(72) Inventor: Young Jae Kim, Daejeon (KR)

(73) Assignee: LG Chem, Ltd. (KR)

(*) Notice: Subject to any disclaimer, the term of this patent is extended or adjusted under 35 U.S.C. 154(b) by 244 days.

(21) Appl. No.: 15/749,841

(22) PCT Filed: Mar. 28, 2017

(86) PCT No.: PCT/KR2017/003287
§ 371 (c)(1),
(2) Date: Feb. 2, 2018

(87) PCT Pub. No.: WO2017/171335
PCT Pub. Date: Oct. 5, 2017

(65) Prior Publication Data
US 2018/0219210 A1 Aug. 2, 2018

(30) Foreign Application Priority Data
Mar. 29, 2016 (KR) .................. 10-2016-0037488

(51) Int. Cl.
*H01M 4/13* (2010.01)
*H01M 4/04* (2006.01)
(Continued)

(52) U.S. Cl.
CPC .......... *H01M 4/0404* (2013.01); *H01M 2/14* (2013.01); *H01M 4/04* (2013.01); *H01M 4/13* (2013.01);
(Continued)

(58) Field of Classification Search
CPC ........ H01M 4/0404; H01M 4/04; H01M 4/13; H01M 4/139; H01M 4/36; H01M 4/485;
(Continued)

(56) References Cited

U.S. PATENT DOCUMENTS 3,009,979 A 11/1961 Corren et al.
9,088,037 B2 7/2015 Leblanc et al.
(Continued)

FOREIGN PATENT DOCUMENTS

JP 2005-327642 A 11/2005
JP 2013-4215 A 1/2013
(Continued)

OTHER PUBLICATIONS

International Search Report, issued in PCT/KR2017/003287, dated Jul. 31, 2017.
(Continued)

*Primary Examiner* — Jane J Rhee
(74) *Attorney, Agent, or Firm* — Lerner, David, Littenberg, Krumholz & Mentlik, LLP

(57) ABSTRACT

The present invention relates to a method for preparing an electrode slurry, and particularly, to a method for preparing an electrode slurry that includes the processes of preparing a mixed solution by mixing a binder, a conductive material, and an active material with a solvent (process 1); separating the mixed solution prepared through process 1 into layers (process 2); and removing at least a portion of the solvent from the mixed solution of process 2, which has been separated into layers (process 3).

19 Claims, 6 Drawing Sheets

(51) Int. Cl.
*H01M 4/62* (2006.01)
*H01M 4/139* (2010.01)
*H01M 4/485* (2010.01)
*H01M 4/583* (2010.01)
*H01M 10/052* (2010.01)
*H01M 4/36* (2006.01)
*H01M 2/14* (2006.01)
*H01M 4/64* (2006.01)
*H01M 10/056* (2010.01)
*H01M 4/02* (2006.01)

(52) U.S. Cl.
CPC ............ *H01M 4/139* (2013.01); *H01M 4/36* (2013.01); *H01M 4/485* (2013.01); *H01M 4/583* (2013.01); *H01M 4/62* (2013.01); *H01M 4/623* (2013.01); *H01M 4/64* (2013.01); *H01M 10/052* (2013.01); *H01M 10/056* (2013.01); *H01M 2004/027* (2013.01); *H01M 2004/028* (2013.01); *Y02T 10/7011* (2013.01)

(58) Field of Classification Search
CPC ........ H01M 4/583; H01M 4/62; H01M 4/623; H01M 4/64; H01M 2/14; H01M 10/052; H01M 10/056; H01M 2004/027; H01M 2004/028
See application file for complete search history.

(56) References Cited

U.S. PATENT DOCUMENTS

| | | | |
|---|---|---|---|
| 10,374,217 B2 * | 8/2019 | Mio | H01M 4/043 |
| 2007/0048618 A1 | 3/2007 | Okumura et al. | |
| 2012/0321950 A1 | 12/2012 | Okumura et al. | |
| 2013/0202781 A1 * | 8/2013 | Kobayashi | H01M 4/04 |
| | | | 427/58 |
| 2013/0316251 A1 | 11/2013 | Leblanc et al. | |
| 2016/0294011 A1 * | 10/2016 | Yamasaki | H01M 10/052 |

FOREIGN PATENT DOCUMENTS

| | | |
|---|---|---|
| JP | 2016-9647 A | 1/2013 |
| KR | 10-2012-0104854 A | 9/2012 |
| KR | 10-2014-0134541 A | 11/2014 |
| KR | 10-2015-0022806 A | 3/2015 |
| KR | 10-1506364 B1 | 3/2015 |
| KR | 10-2015-0071452 A | 6/2015 |
| KR | 10-2015-0124928 A | 11/2015 |

OTHER PUBLICATIONS

European Search Report for Appl. No. 17775759.8 dated Jun. 1, 2018.

* cited by examiner

[FIG. 2]
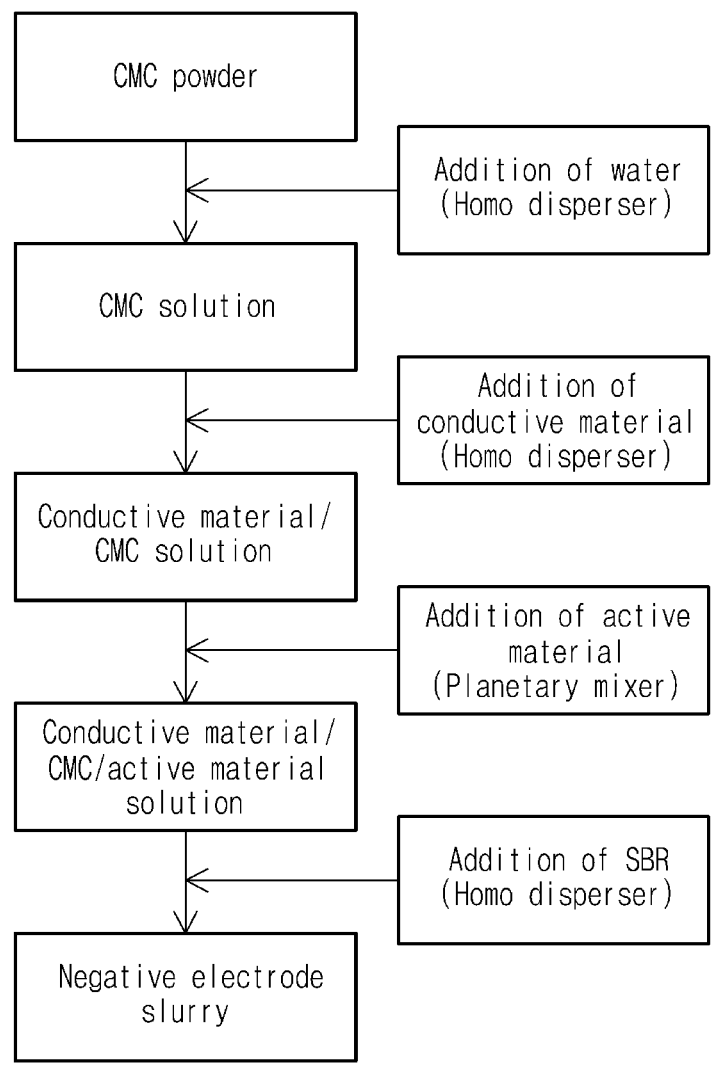

[FIG. 3]
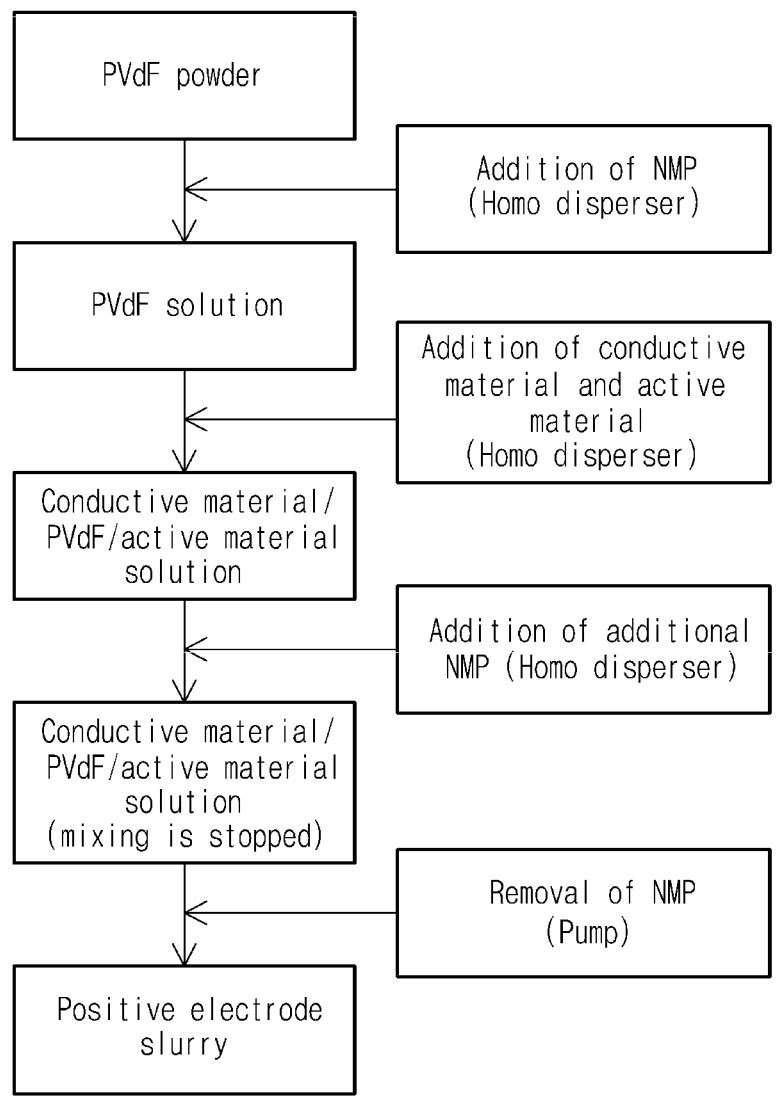

[FIG. 4]
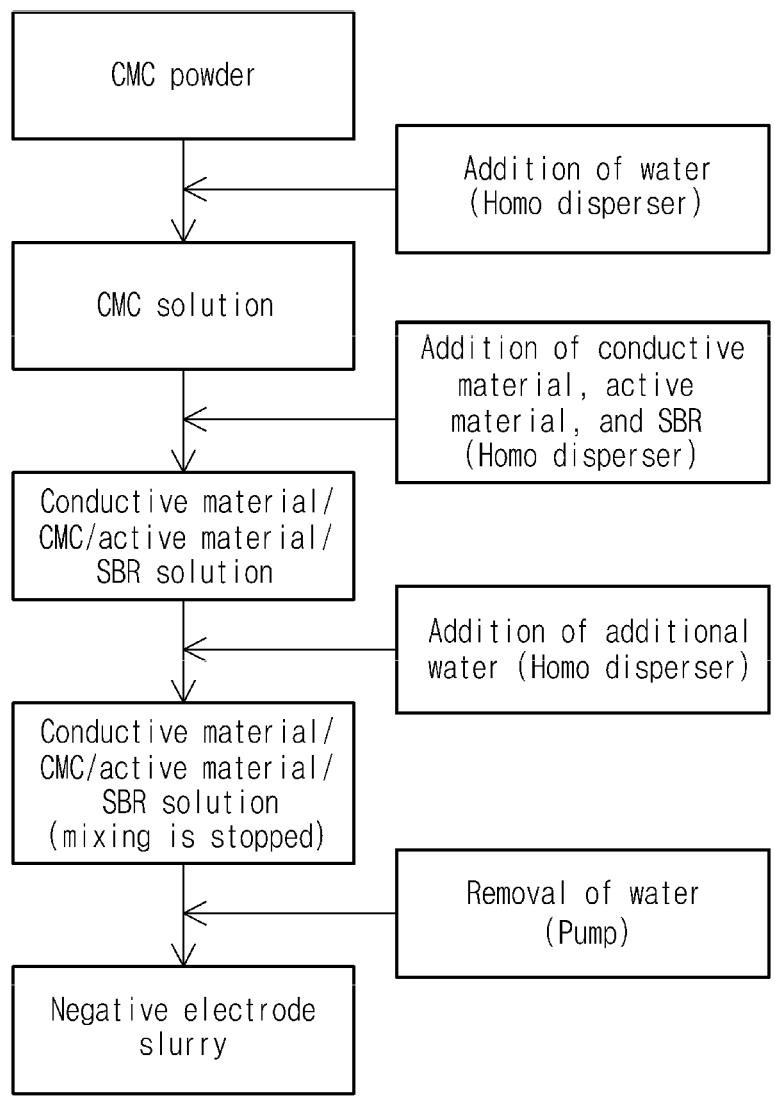

[FIG. 5]
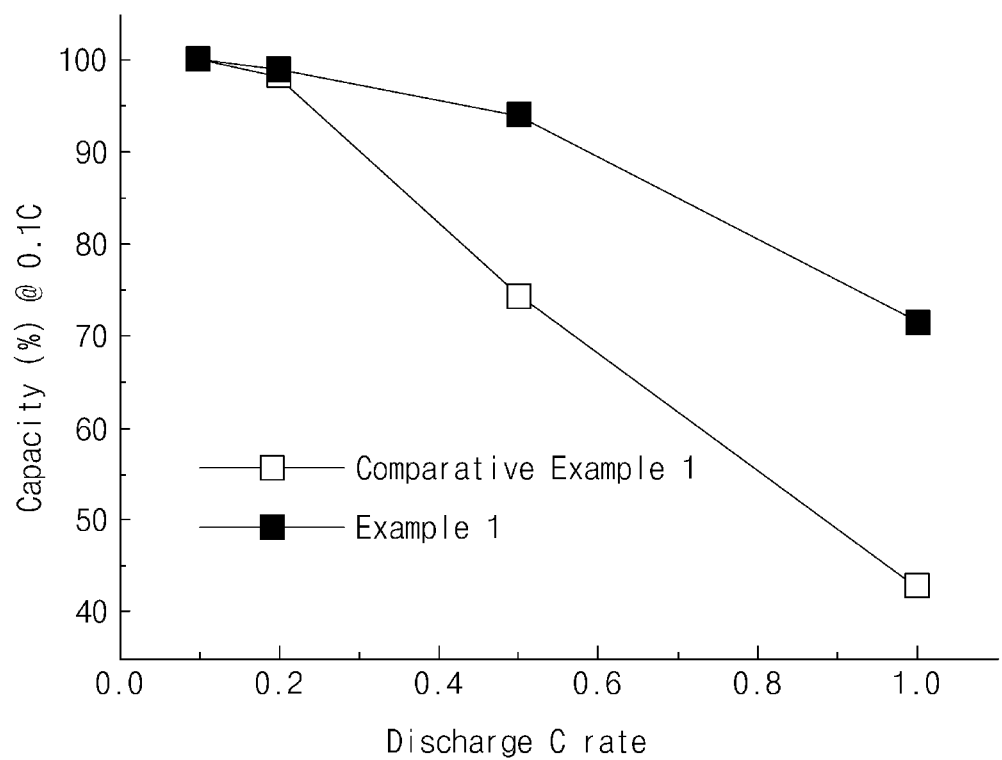

[FIG. 6]
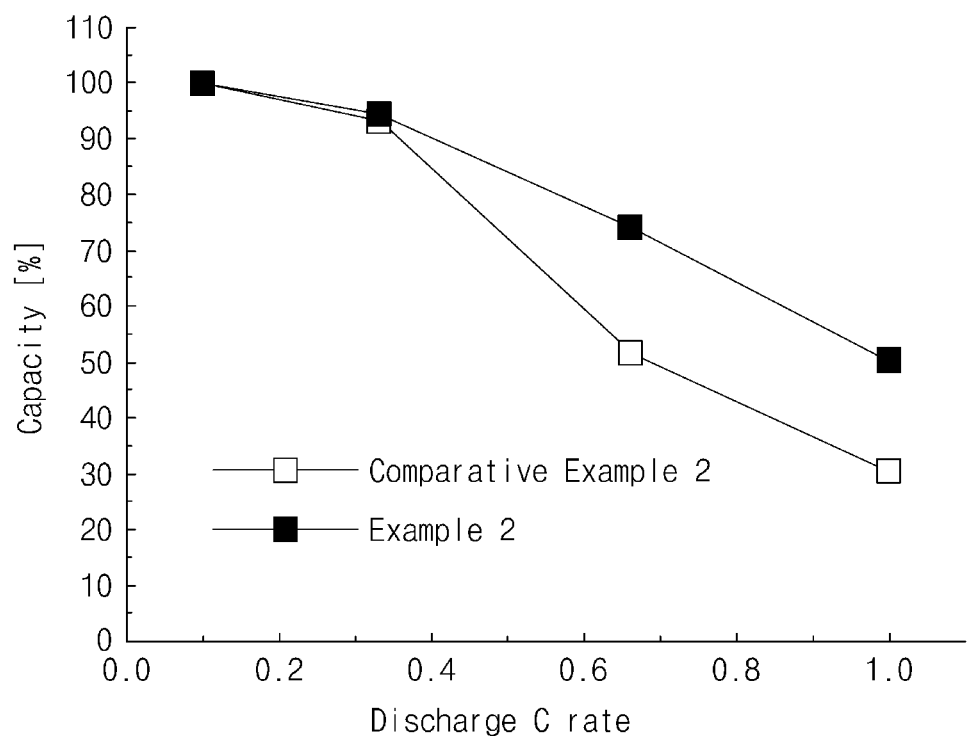

METHOD FOR PREPARING ELECTRODE SLURRY

CROSS-REFERENCE TO RELATED APPLICATION

This application claims priority to and the benefit of Korean Patent Application No. 10-2016-0037488, filed on Mar. 29, 2016, the disclosure of which is incorporated herein by reference in its entirety.

TECHNICAL FIELD

The present invention relates to a method for preparing an electrode slurry.

BACKGROUND ART

Due to the rapid increase in the use of fossil fuels, the demand for the use of alternative energy or clean energy is increasing. Accordingly, electric power generation and power storage based on an electrochemical reaction have been among the most active fields of research.

A secondary battery is a typical example of an electrochemical device utilizing such electrochemical energy currently being used, and the application area thereof is gradually increasing. With the recent technology development and increased demand for mobile devices such as portable computers, mobile telephones, and cameras, the demand for secondary batteries as the energy source thereof is rapidly increasing. Among such secondary batteries, lithium secondary batteries which exhibit high energy density and high operating potential and have a long cycle life and a low self-discharge rate have been frequently researched and extensively used commercially.

Conventional secondary batteries have been used for various purposes, and efforts have been made to produce batteries having various advantageous characteristics such as high capacity, high output, a long life, and high-speed charging. In producing a battery having the advantage of high capacity among those listed above, the most important thing is how much active material can be included in the battery.

Hence, there is a method of producing a battery having high capacity and high output by increasing an active material content and lowering a binder content, and, in order to obtain an electrode exhibiting the same levels of adhesion and phase stability even with a low binder content, a binder having a high molecular weight or high degree of substitution is used.

However, a solution containing a binder having a high molecular weight or a high degree of substitution dissolved therein has a higher viscosity and higher elasticity compared to a solution containing a binder having a lower molecular weight or a lower degree of substitution at the same binder content. Therefore, there is a problem that active material particles, a conductive material, etc. are not easily dispersed in a solvent by the same dispersion method. When more solvent is added to reduce the binder content and thereby solve the above problem, an electrode slurry with a lower solid content is obtained. In this case, a battery with a lower capacity is produced, and drying conditions become difficult, resulting in cost disadvantages.

Accordingly, it is required to develop an electrode slurry that has a high viscosity and includes well-dispersed particles such as those of an active material and a conductive material, and thus can be applied with a large thickness to produce an electrode.

PRIOR-ART DOCUMENTS

Patent Documents (Patent Document 1) Japanese Laid-Open Patent Application No. 2005-327642

DETAILED DESCRIPTION OF THE INVENTION

Technical Problem

A technical objective of the present invention is to provide a method for preparing an electrode slurry that has a high viscosity and includes well-dispersed particles such as those of active material particles and a conductive material, and thus can be applied with a large thickness to produce an electrode.

Another technical objective of the present invention is to provide a method for preparing an electrode slurry for producing a high-capacity yet high-performance electrode.

Technical Solution

To achieve the objectives, the present invention provides a method for preparing an electrode slurry which includes the processes of preparing a mixed solution by mixing a binder, a conductive material, and an active material with a solvent (process 1); separating the mixed solution prepared through process 1 into layers (process 2); and removing at least a portion of the solvent from the mixed solution of process 2, which has been separated into layers (process 3).

Advantageous Effects of the Invention

The method for preparing an electrode slurry according to the present invention can prepare an electrode slurry having a high solid content and being at well dispersed state despite the high molecular weight or high degree of substitution of the binder and thickener included in the slurry, and thus the use of the electrode slurry can produce an electrode with excellent performance. In addition, since the electrode slurry are dispersed in a solution having low viscosity, additional equipment such as a planetary mixer is not required, and since the sedimentation rate of the solid ingredients is high, process costs can be reduced, and process time can be shortened.

DESCRIPTION OF THE DRAWINGS

FIG. 2 is a process schematic diagram for illustrating one example of a method for preparing a negative electrode slurry among conventional methods for preparing an electrode slurry.

FIG. 3 is a process schematic diagram for illustrating one example of a method for preparing a positive electrode slurry among methods for preparing an electrode slurry according to the present invention.

FIG. 4 is a process schematic diagram for illustrating one example of a method for preparing a negative electrode slurry among methods for preparing an electrode slurry according to the present invention.

FIGS. 5 and 6 are graphs for showing discharging capacities of examples of the present invention and comparative examples.

MODE OF THE INVENTION

Figure 1:
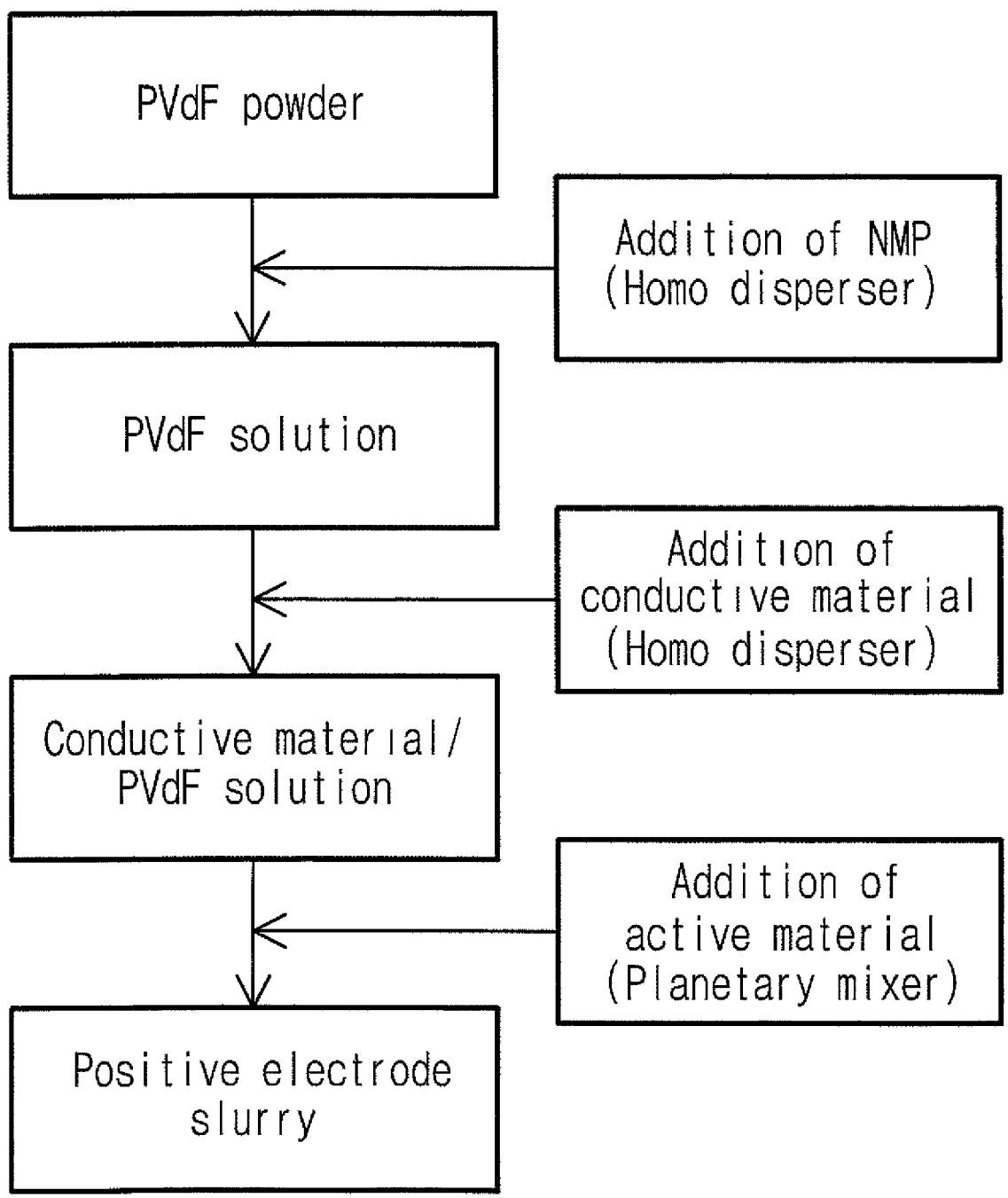
FIG. 1 is a process schematic diagram for illustrating one example of a method for preparing a positive electrode slurry among conventional methods for preparing an electrode slurry.

Hereinafter, a more detailed description of the present invention will be provided to facilitate understanding of the present invention.

The terms or words used herein and in the claims should not be restrictively construed according to their ordinary or dictionary meaning, and, based on the principle that the inventor can appropriately define concepts of terms for describing his/her invention in the best way, should be interpreted to have the meaning and concept that are consistent with the technical spirit of the present invention.

The terminology provided herein is merely used for the purpose of describing particular embodiments, and is not intended to be limiting of exemplary embodiments of the present invention. The singular forms "a," "an," and "the" are intended to include the plural forms as well unless the context clearly indicates otherwise.

It should be understood that the terms "comprises," "comprising," "includes," "including," "has," and/or "having," when used herein, specify the presence of stated features, integers, steps, operations, elements, components, and/or combinations thereof, but do not preclude the presence or addition of one or more other features, integers, steps, operations, elements, components, and/or combinations thereof.

In one embodiment of the present invention, the method for preparing an electrode slurry includes the processes of preparing a mixed solution by mixing a binder, a conductive material, and an active material with a solvent (process 1); separating the mixed solution prepared through process 1 into layers (process 2); and removing at least a portion of the solvent from the mixed solution of process 2, which has been separated into layers (process 3).

Examples of the method for preparing an electrode slurry according to the present invention are illustrated in FIGS. 3 and 4, and each process of the method for preparing an electrode slurry according to the present invention will be described in detail hereinafter. However, the methods illustrated in FIGS. 3 and 4 are merely examples, and the present invention described herein is not limited to the illustrations provided by FIGS. 3 and 4.

In the method for preparing an electrode slurry according to the present invention, process 1 is a process of preparing a mixed solution by mixing a binder, a conductive material, and an active material with a solvent. Compared to a conventional method, in process 1, a low-viscosity solution is prepared by using a larger amount of solvent to be mixed with a binder, a conductive material, and an active material so as to prepare an electrode slurry having excellent dispersed state.

The mixed solution of process 1 may have a viscosity of 100 cP to 500 cP. When the viscosity of the mixed solution of process 1 is lower than 100 cP, the dispersing power generated by a dispersion device is not easily delivered to the mixed solution, and thus the solid ingredients are not sufficiently dispersed. When the viscosity of the mixed solution of process 1 is higher than 500 cP, the sedimentation rate of the solid ingredients is low; therefore, the solution is in the state of partial sedimentation and partial dispersion, and it requires more time to collect the slurry from the solution, which results in an increase in the entire slurry production process time, decreased process efficiency, and increased production costs.

Meanwhile, the viscosity of the solution may be measured using a Brookfield DV2T viscometer equipped with Spindle #63, which is used for measuring a low viscosity, at a constant rpm of 12. However, the method for measuring viscosity is not limited to the method described above, and may be implemented using other measuring devices if generally the same rpm is to be applied and the sample to be measured (e.g., solution) has a viscosity in a range of about 10 cP to 1000 cP.

In the present invention, the "solid ingredients" refers to solutes or solid substances included in a solution and may refer to substances such as a binder, a thickener, an active material, and/or a conductive material.

The mixing process in process 1 may be carried out using one or more selected from the group consisting of a homo mixer (homo disperser mixer), an ultrasonic disperser, and a homogenizer. Since the solution prepared through process 1 according to the present invention has a low viscosity, solid ingredients thereof can be sufficiently dispersed therein even by using a device generating a low dispersing power such as a homo disperser mixer. Since the same or higher level of dispersion of solid ingredients in the solution can be attained even without using an additional device such as a planetary mixer which can generate a high dispersing power, there may be process advantages in terms of costs and time.

In the method for preparing an electrode slurry according to the present invention, when the electrode slurry is for a positive electrode, process 1 may include the processes of mixing a binder and a solvent (process A); and adding a conductive material and an active material to the solution prepared through the process A and performing mixing (process B). Specifically, to facilitate the dispersion of the binder, the mixed solution containing a mixture of the binder, conductive material, and active material may be prepared through the processes of mixing the binder having a high molecular weight or a high degree of substitution with the solvent and dispersing the binder in the solvent at a predetermined concentration; and adding the conductive material and active material to the dispersion, wherein the processes are performed in the order written. In addition, after process B, the viscosity of the resulting mixed solution may be adjusted by adding an additional solvent thereto.

On the other hand, when the electrode slurry is for a negative electrode, a thickener may be further added to the mixture of process 1 in addition to the binder, conductive material, and active material, and process 1 may include the processes of mixing the thickener and the solvent (process I); and adding the conductive material, active material, and binder to the mixed solution prepared through the process I and performing mixing (process II). Specifically, to facilitate the dispersion of the thickener and binder, the mixed solution containing a mixture of the binder, conductive material, active material, and thickener may be prepared through the processes of mixing the thickener having a high weight average molecular weight with the solvent and dispersing the thickener in the solvent at predetermined concentration; and adding the conductive material, active material, and binder to the dispersion, wherein the processes are performed in the order written. If necessary, the thickener having a high weight average molecular weight may be used in combination with a thickener having a low weight average molecular weight. In addition, after process II, the viscosity of the resulting mixed solution may be adjusted by adding an additional solvent to the mixed solution.

When the electrode slurry is for a positive electrode, the active material, conductive material, and binder may be mixed in a weight ratio of 94~99:0.518 2.0:0.518 4.0, particularly 97:1:2. When the electrode slurry is for a negative electrode, the active material, conductive material, thickener, and binder may be mixed in a weight ratio of 93~97:0.5~1.5:0.5~1.5:2.0~4.0, particularly 96:0.5:1:2.5. As described above, to produce a secondary battery with a high capacity and high output, it is necessary to increase the active material content and lower the binder and thickener contents because the binder and thickener may act as resistance in the battery.

To produce an electrode having desired adhesion properties and stability even with the use of a reduced amount of a binder as shown in the weight ratio of solid ingredients of the electrode slurry described above, a binder or thickener having a high weight average molecular weight may be used. When the electrode slurry is for a positive electrode, a binder having a weight average molecular weight of 600,000 to 1,000,000 may be used. On the other hand, when the electrode slurry is for a negative electrode, a thickener having a weight average molecular weight of 700,000 to 1,500,000 or a binder having a weight average molecular weight of 200,000 to 500,000 may be used.

As the binder, any of various types of polymeric binders such as poly(vinylidene fluoride-co-hexafluoropropylene) polymers (PVdF-co-HFPs), polyvinylidene fluoride (PVdF), polyacrylonitrile, polymethyl methacrylate, polyvinylpyrrolidone, tetrafluoroethylene, polyethylene, polypropylene, ethylene-propylene-diene monomers (EPDMs), sulfonated EPDMs, styrene-butadiene rubber (SBR), fluorinated rubbers, polyacrylic acid, and polymers in which hydrogen atoms of the above polymers are substituted with Li, Na, Ca or the like, various copolymers, or the like may be used.

As the thickener, one selected from the group consisting of carboxymethyl cellulose (CMC), carboxyethyl cellulose, starches, regenerated cellulose, ethyl celluloses, hydroxymethyl celluloses, hydroxyethyl celluloses hydroxypropyl celluloses and polyvinyl alcohol may be used.

The conductive material is not particularly limited as long as it does not cause a chemical change in the battery and has conductivity. For example, the conductive material may be graphite such as natural graphite or artificial graphite; a carbon-based material such as carbon black, acetylene black, Ketjen black, channel black, furnace black, lamp black, or thermal black; a conductive fiber such as carbon fiber or metallic fiber; conductive tubes such as carbon nanotubes; metallic powder such as carbon fluoride powder, aluminum powder, or nickel powder; a conductive whisker such as zinc oxide or potassium titanate; a conductive metal oxide such as titanium oxide; or a conductive material such as a polyphenylene derivative.

For example, when the electrode slurry is for a positive electrode, a positive electrode active material, PVdF as a binder, and N-methyl-2-pyrrolidone as a solvent may be used, and when the electrode slurry is for a negative electrode, a negative electrode active material, CMC as a thickener, SBR as a binder, and water as a solvent may be used, in which case the SBR may be provided in the form of a solution including the SBR dispersed therein.

The active material may be classified into a positive electrode active material used in a positive electrode and a negative electrode active material used in a negative electrode. The active material of process 1 may have an average particle size ($D_{50}$) of 5 μm to 35 μm, particularly 5 μm to 25 μm for a positive electrode active material or 15 μm to 35 μm for a negative electrode active material.

In the present invention, the average particle size ($D_{50}$) can be defined as a 50% particle size of particle size distribution. In one embodiment of the present invention, the average particle size ($D_{50}$) may be measured, for example, by using a laser diffraction method. The laser diffraction method can generally measure a particle size ranging from a submicron region to several mm and produce a result having high reproducibility and high resolvability.

More specifically, precursor particles are dispersed in a dispersion medium, the dispersion is introduced into a commercially available laser diffraction particle size analyzer (e.g., Microtrac MT-3000) and irradiated with ultrasonic waves at a frequency of about 28 kHz and an output of 60 W, and the average particle size ($D_{50}$) corresponding to the $50^{th}$ percentile in the particle size distribution determined by the measuring device is identified.

The positive electrode active material may be a layered compound such as lithium cobalt oxide ($LiCoO_2$) or lithium nickel oxide ($LiNiO_2$); a compound partly substituted with one or more transition metals; lithium manganese oxide represented by $Li_{1+y1}Mn_{2-y1}O_4$ (here, $0 \leq y1 \leq 0.33$), $LiMnO_3$, $LiMn_2O_3$, or $LiMnO_2$; lithium copper oxide ($Li_2CuO_2$); vanadium oxide such as $LiV_3O_8$, $V_2O_5$, or $Cu_2V_2O_7$; Ni site-type lithium nickel oxide represented by $LiNi_{1-y2}M_{y2}O_2$ (wherein M=Co, Mn, Al, Cu, Fe, Mg, B, or Ga, and $0.01 \leq y2 \leq 0.3$); lithium manganese composite oxide represented by $LiMn_{2-y3}M_{y3}O_2$ (wherein M=Co, Ni, Fe, Cr, Zn, or Ta, and $0.01 \leq y3 \leq 0.1$) or $Li_2Mn_3MO_8$ (wherein M=Fe, Co, Ni, Cu, or Zn); $LiMn_2O_4$ in which a part of Li has been substituted with an alkaline earth metal ion; or the like, but the present invention is not limited thereto.

As the negative electrode active material, a compound capable of reversible intercalation and deintercalation of lithium ions may be used. As a specific example, any one or a mixture of two or more of carbon materials such as artificial graphite, natural graphite, graphitized carbon fiber, and amorphous carbon; a metal compound capable of forming an alloy with lithium, e.g., Si, Al, Sn, Pb, Zn, Bi, In, Mg, Ga, Cd, a Si alloy, a Sn alloy, or an Al alloy; a metal oxide capable of doping and dedoping lithium, e.g., SiOx ($0<x<2$), $SnO_2$, vanadium oxide, or lithium vanadium oxide; and a composite including the above-listed metal compound and carbon material, e.g., a Si—C composite or a Sn—C composite, may be used as the negative electrode active material. Also, a lithium metal thin film may be used as the negative electrode active material. In addition, any one of low-crystallinity carbon, high-crystallinity carbon, and the like may be used as the carbon material. Soft carbon and hard carbon are representative of low-crystalline carbon; and high-temperature baked carbon such as amorphous, platy, flaky, spherical or fibrous natural graphite, and artificial graphite, Kish graphite, pyrolytic carbon, mesophase pitch-based carbon fiber, meso-carbon microbeads, mesophase pitches, and petroleum or coal tar pitch-derived cokes are representative of high-crystalline carbon.

In the method for preparing an electrode slurry according to the present invention, process 2 is a process of separating the mixed solution prepared through process 1 into layers. Specifically, in process 2, the mixed solution prepared through process 1 and having a low viscosity is separated into an upper layer and a lower layer so that a portion of the solvent can be removed from the mixed solution.

In process 2, the separation may be carried out by allowing the mixed solution containing solid ingredients to stand to induce the solid ingredients to settle. The mixed solution is mixed with the solvent at the state where the solid ingredients is dispersed, and when the mixed solution is allowed to stand, the solid ingredients settle by gravity. Accordingly, the mixed solution may be separated into a lower layer comprising mostly solid ingredients and an upper layer comprising mostly the solvent. Among the solid ingredients, the active material, which has the largest particle size, settles most rapidly, and the conductive material adsorbed to the active material and the binder adsorbed to the conductive material or active material settle in the form of particles. Therefore, after separation, the solid ingredients contained in the upper layer may include a conductive material remaining unadsorbed to the active material or an excess of a thickener or binder adsorbed to the unadsorbed conductive material. The mixed solution may be allowed to stand for 30 minutes to 120 minutes. When the mixed solution is allowed to stand for less than 30 minutes, the mixed solution is not completely separated into layers and a large amount of solid ingredients thereof remain in the upper portion of the solution; therefore, it is difficult to produce an electrode with a desired composition, and material loss is increased. On the other hand, when the mixed solution is allowed to stand for more than 120 minutes, the overall process time is excessively increased; therefore, process efficiency may decrease, and production costs may increase.

In process 2, the solid ingredients, particularly the active material, conductive material, and binder aggregated into particles or the active material, conductive material, binder, and thickener aggregated into particles may settle at a rate of 0.04 cm/hr to 4.67 cm/hr. When non-cohesive particles (i.e., particles exhibiting no cohesion) stops at the state of being dispersed in a single solvent, they settle at gravitational acceleration. In this case, the sedimentation rate is governed by Stoke's Law and can be calculated as follows.

$$V = \frac{d^2 g(\rho_p - \rho_s)}{18\eta} \qquad \text{[Equation 1]}$$

(here, V is the sedimentation rate of the particles, g is gravitational acceleration (9.8 m/s$^2$), $\rho_s$ is the density of the solvent, $\rho_p$ is the density of particles formed by the aggregation of the active material, conductive material, and binder or the aggregation of the active material, conductive material, binder, and thickener, d is an average particle size ($D_{50}$) of the active material, and $\eta$ is the viscosity of the mixed solution.)

Since the particle sizes of the conductive material, binder, and thickener are negligibly small compared to the particle size of the active material, it may be possible to use only the particle size of the active material among the solid ingredients as the estimate for d in Equation 1.

The positive electrode slurry or negative electrode slurry prepared by a general method contains an excessively large amount of solid ingredients, and the solid ingredients settling compress the solid ingredients that have already settled underneath, thus forming a consolidated sediment while pushing the solvent upwards. Therefore, the sedimentation rate of the solid ingredients cannot be accurately calculated.

However, in the case of the electrode slurry according to the present invention, since the solid ingredients settle in a low-viscosity mixed solution, the distance between active material particles among the solid ingredients is infinitely large compared to the distance at which the active material particles exhibit cohesion. Therefore, the sedimentation of those solid ingredients can be regarded as sedimentation of non-cohesive particles, and, accordingly, Stoke's Law can be applied to this situation.

In the method for preparing an electrode slurry according to the present invention, process 3 is a process of removing at least a portion of the solvent from the mixed solution of process 2, which has been separated into layers. Specifically, in process 3, while the solid ingredients initially dispersed in a low-viscosity mixed solution have previously settled, a portion of the solvent is removed from the upper layer mostly consisting of the solvent, and thereby a high-viscosity mixed solution is once again obtained. As a result, an electrode slurry including well-dispersed solid ingredients and having a high viscosity can be prepared, and, by using the electrode slurry, a high capacity yet high-performance electrode can be produced.

In process 3, a portion of the solvent may be removed using a pump. Compared to when the solvent is evaporated by heating, when the solvent is removed using a pump as described above, deformation of the active material, conductive material, binder, thickener, etc. by heat can be prevented, and the viscosity of the solvent can be more easily adjusted because the amount of the removed solvent can be accurately determined. In addition, since the upper layer contains a trace amount of the binder or a small amount of the conductive material particles dispersed therein, the original solvent can be recovered for reuse through centrifugation capable of completely settling the particles or filtering capable of filtering out minute particles, and thereby production costs can be reduced.

Meanwhile, the mixed solution after a portion of the solvent has been removed through process 3 may have a viscosity of 15,000 cP to 30,000 cP. When the mixed solution after a portion of the solvent has been removed has a viscosity of less than 15,000 cP, the electrode slurry may have flowability at the time of coating; therefore, it is difficult to attain a high loading level (i.e., application of a large amount of the active material to a surface of a current collector), and thus it is difficult to produce a high capacity electrode. On the other hand, when the mixed solution after a portion of the solvent has been removed has a viscosity of greater than 30,000 cP, the electrode slurry is not easily applied to a surface of a current collector due to a high injection pressure generated during the process, and, since the electrode slurry is very solid-like, there is a high possibility that a coating with low uniformity is produced.

In one embodiment of the present invention, the electrode slurry may include a binder, a conductive material, and an active material, and have a viscosity of 15,000 cP to 30,000 cP, particularly 20,000 cP to 25,000 cP.

The electrode slurry prepared by the method for preparing an electrode slurry has a high viscosity and includes a binder or thickener that is well-dispersed in the electrode slurry despite having a high weight average molecular weight.

A binder or thickener having a high weight average molecular weight may be used. When the electrode slurry is for a positive electrode, a binder having a weight average molecular weight of 600,000 to 1,000,000 may be used. On the other hand, when the electrode slurry is for a negative electrode, a thickener having a weight average molecular weight of 700,000 to 1,500,000 or a binder having a weight average molecular weight of 200,000 to 500,000 may be used.

When the electrode slurry is for a positive electrode, the active material, conductive material, and binder may be mixed in a weight ratio of 94~99:0.5~2.0:0.5~4.0, particularly 97:1:2. When the electrode slurry is for a negative electrode, the active material, conductive material, thickener, and binder may be mixed in a weight ratio of 93~97:0.5~1.5:0.5~1.5:2.0~4.0, particularly 96:0.5:1:2.5. As described above, to produce a secondary battery with a high capacity and high output, the active material content may be relatively increased, and the binder and thickener contents may be reduced.

Meanwhile, the electrode slurry may have an absolute value of zeta potential of 20 mV to 30 mV. The dispersion stability of colloidal particles can be evaluated based on the magnitude of the absolute value of zeta potential. Here, "zeta potential" is an index indicating the degree of surface charge of colloidal particles suspended in a liquid. In addition, because when an external electric field is applied to the colloid, the colloidal particles migrate (move) in a direction opposite to the sign of the surface potential, zeta potential is calculated in consideration of hydrodynamic effects (the viscosity, dielectric constant, etc. of a dispersing medium) and the strength of an electric field which affects the velocity of particle migration. That is, as the absolute value of zeta potential increases, the repulsive force between the particles increases, and thus the particles are better dispersed, and the dispersed state is better retained. On the other hand, as the zeta potential approaches zero, the particles tend to agglomerate easily.

When the electrode slurry has an absolute value of zeta potential of less than 20 mV, solid ingredients thereof may not be well dispersed therein, causing an insufficient amount of the polymer used as a binder or thickener to be adsorbed to a surface of the active material; therefore, the conductive material may not be well dispersed in the electrode slurry and adhesion within the electrode may be weak, and thus the electrical resistance may be increased. When the electrode slurry has an absolute value of zeta potential of greater than 30 mV, solid ingredients thereof may be excessively dispersed, causing an excessive amount of the polymer used as a binder or thickener to be adsorbed to a surface of the active material, and the viscosity of the slurry may be excessively reduced, thus making it impossible to produce a thick electrode.

In one embodiment of the present invention, the method for producing an electrode includes the processes of applying an electrode slurry prepared by the method for preparing an electrode slurry to a surface of a current collector (process 4); and drying the electrode slurry that has been applied to a surface of the current collector through process 4 and rolling the same (process 5).

Hereinafter, each process of the method for producing an electrode according to the present invention will be described in detail.

In one embodiment of the present invention, the process 4 of the method for producing an electrode is a process of applying an electrode slurry prepared by the method for preparing an electrode slurry to a surface of a current collector. The electrode slurry prepared by the method for preparing an electrode slurry has an excellent dispersed state and a high solid content despite using a binder or thickener having a high weight average molecular weight. Therefore, the electrode slurry has a high viscosity such that it can be applied with a large thickness, and, since the electrode slurry includes a well-dispersed binder or thickener, the electrode produced based thereon may have excellent performance.

The current collector is not particularly limited as long as it does not cause a chemical change in the battery and has conductivity. For example, the current collector is copper, stainless steel, aluminum, nickel, titanium, baked carbon, or aluminum or stainless steel whose surface has been treated with carbon, nickel, titanium, silver, or the like.

In this case, a thickness of the electrode slurry applied to a surface of the current collector may be 130 μm to 180 μm. Since the electrode slurry prepared according to one embodiment of the present invention has a viscosity of 15,000 cP to 30,000 cP, it may be applied with a larger thickness compared to a conventional electrode slurry.

In one embodiment of the present invention, the process 5 of the method for producing an electrode is a process of drying the electrode slurry that has been applied to a surface of the current collector through process 4 and rolling the same.

The drying process is a process of removing the solvent in the electrode slurry to dry the electrode slurry that has been applied to a surface of the current collector. Specifically, in one specific embodiment, the drying process may be carried out in a vacuum oven at 50° C. to 200° C. for up to one day.

The rolling process may be carried out by passing the electrode between two rollers heated at a high temperature to compress the same to a desired thickness so that an electrode with increased capacitance density and increased adhesion between the current collector and the active material is obtained. Specifically, in one embodiment, the rolling process may be carried out at a pressure of 10 MPa to 20 MPa by using rollers heated to a temperature of 60° C. to 90° C.

When the electrode slurry is for a positive electrode, the active material, conductive material, and binder may be mixed in a weight ratio of 94~99:0.5~2.0:0.5~4.0, particularly 97:1:2. When the electrode slurry is for a negative electrode, the active material, conductive material, thickener, and binder may be mixed in a weight ratio of 93~97:0.5~1.5:0.5~1.5:2.0~4.0, particularly 96:0.5:1:2.5.

Since the electrode produced by the method for producing an electrode is produced using the electrode slurry prepared by the method for preparing an electrode slurry, a binder or thickener may be well-dispersed in the slurry despite having a high weight average molecular weight.

A binder or thickener having a high weight average molecular weight may be used. When the electrode slurry is for a positive electrode, a binder having a weight average molecular weight of 600,000 to 1,000,000 may be used. On the other hand, when the electrode slurry is for a negative electrode, a thickener having a weight average molecular weight of 700,000 to 1,500,000 or a binder having a weight average molecular weight of 200,000 to 500,000 may be used.

The electrode may have a thickness of 150 μm to 200 μm and an adhesive strength between the current collector and electrode slurry of 15 gf to 60 gf. In one embodiment of the present invention, the electrode may have a large thickness and, by including a well-dispersed binder therein, may also have a high adhesive strength between the current collector and electrode slurry. In this case, the adhesive strength between the current collector and electrode slurry in the electrode may be measured by a 180° peel test carried out at a rate of 300 mm/min at 50 mm.

In one embodiment, the present invention provides a secondary battery including a negative electrode, a positive electrode, a separator interposed between the negative electrode and positive electrode, and an electrolyte, wherein at least one of the negative electrode and positive electrode may be the electrode of the present invention.

By including the electrode of the present invention, the secondary battery can have excellent battery life and exhibit excellent charging and discharging characteristics while having high capacity.

The separator serves to separate the negative electrode and positive electrode and provides a passage for the migration of lithium ions. The material for the separator is not particularly limited as long as it is a material commonly used as a separator for a secondary battery, and particularly, a material which has a low resistance to the migration of electrolyte ions and is well impregnated in an electrolyte solution is preferable. Specifically, as the separator, a porous polymer film, for example, a porous polymer film made of a polyolefin-based polymer such as an ethylene homopolymer, a propylene homopolymer, an ethylene/butene copolymer, an ethylene/hexene copolymer, or an ethylene/methacrylate copolymer; or a stacked structure having two or more layers made thereof may be used. Alternatively, a common porous non-woven fabric, for example, a non-woven fabric made of high-melting-point glass fiber, polyethylene terephthalate fiber or the like may be used as the separator. Also, the separator may include a coating layer containing ceramic substances or polymeric substances applied to a surface thereof so that heat resistance or mechanical strength thereof can be ensured, and may have either a single-layer structure or a multi-layer structure.

Examples of the electrolyte include organic liquid electrolytes, inorganic liquid electrolytes, solid polymer electrolytes, gel polymer electrolytes, inorganic solid electrolytes, and molten-type inorganic electrolytes which can be used in the production of a lithium secondary battery, but the present invention is not limited thereto.

Specifically, the electrolyte may include a non-aqueous organic solvent and a metal salt.

Examples of the non-aqueous organic solvent include aprotic organic solvents such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxy Franc, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triesters, trimethoxymethane, dioxolane derivatives, sulfolane, methylsulfolane, 1,3-dimethyl-2-imidazolidinone, propylene carbonate derivatives, tetrahydrofuran derivatives, ethers, methyl propionate, and ethyl propionate.

Particularly, among the carbonate-based organic solvents listed above, ethylene carbonate and propylene carbonate, which are cyclic carbonate compounds, are preferably used because they are high-viscosity organic solvents and dissociate a lithium salt effectively due to their high dielectric constant. It is more preferable that such a cyclic carbonate compound is used in combination with a linear carbonate compound having low viscosity and a low dielectric constant, such as dimethyl carbonate or diethyl carbonate, in an appropriate ratio because an electrolyte having high electrical conductivity may be formed.

The metal salt may be a lithium salt, which is a material that is readily soluble in the non-aqueous electrolyte. For example, the lithium salt may include, as an anion, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the electrolyte components, for the purpose of improving battery life, suppressing a decrease in battery capacity, improving discharge capacity of the battery, and the like, the electrolyte may further include one or more additives such as haloalkylene carbonate-based compounds (e.g., difluoroethylene carbonate), pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, and aluminum trichloride.

The secondary battery is useful in the fields of mobile devices such as mobile phones, notebook computers, and digital cameras, and electric vehicles such as hybrid electric vehicles (HEVs), and the like.

In one embodiment, the present invention provides a battery module including the above-described secondary battery as a unit cell; and a battery pack including the battery module. The battery module or battery pack may be used as a power source for any one or more medium- to large-sized devices among power tools; electric vehicles (EVs) including regular electric vehicles, hybrid electric vehicles, and plug-in hybrid electric vehicles (PHEVs); and electric power storage systems.

Hereinafter, exemplary embodiments of the present invention will be described in detail so that the present invention can be easily implemented by those of ordinary skill in the art. However, the present invention may be embodied in many different forms and should not be construed as being limited to the embodiments set forth herein.

Example 1

Production of Positive Electrode

Process 1: Preparation of Mixed Solution 8.511 g of PVdF powder having a weight average molecular weight of 900,000 was added to 133.333 g of N-methyl-2-pyrrolidone, and the substances were mixed using a homo disperser mixer at 70° C. and 2500 rpm for 90 minutes to prepare a dispersion containing 6 wt % of PVdF.

4.255 g of carbon black as a conductive material was added to a portion (38.780 g) of the dispersion containing PVdF, and the substances were mixed using a homo disperser mixer at 2500 rpm for 20 minutes to prepare a conductive material/PVdF dispersion.

200 g of a lithium cobalt oxide (LCO; positive electrode active material) having an average particle size ($D_{50}$) of 15 μm was added to the above-described conductive material/PVdF dispersion, and the substances were mixed using a planetary mixer at 45 rpm for 40 minutes to prepare a mixed slurry. To the mixed slurry, the remainder (103.064 g) of the above-described dispersion containing PVdF and 126.7 g of N-methyl-2-pyrrolidone were added to prepare a mixed solution having a solid content of 45% and including the positive electrode active material, conductive material, and PVdF mixed in a final weight ratio of 94:2:4. In this case, the viscosity of the solution as measured with a Brookfield viscometer was 500 cP (the viscosity was measured using a Brookfield DV2T viscometer equipped with Spindle #63, which is used for measuring a low viscosity, at a constant rpm of 12).

Process 2: Separation of Solution into Layers

The mixed solution prepared through process 1 was allowed to stand for 120 minutes to separate the solution into a lower layer comprising mostly solid ingredients and an upper layer comprising mostly the solvent. In this case, the calculated sedimentation rate of the solid ingredients was 0.313 cm/hr (can be calculated by Equation 1, wherein g=9.8 m/s$^2$, $\rho_p$=4.60×10$^3$ kg/m$^3$, $\rho_s$=1.05×10$^3$ kg/m$^3$, D=15×10$^{-6}$ m, and η=0.5 Pa·s (=500 cP)).

Process 3: Partial Removal of Solvent 183.44 g of the mixed solution separated into upper and lower layers through process 2 was removed from the upper layer comprising mostly the solvent by using a pump to prepare an electrode slurry having a solid content of 73.5%. In this case, the electrode slurry had a viscosity of 25,500 cP as measured with a viscometer and an absolute value of a zeta potential of 22.1 mV.

Process 4: Production of Positive Electrode

The electrode slurry prepared through process 3 was applied at a thickness of 180 μm to a surface of a 20 μm aluminum thin film as a positive electrode current collector, dried in a vacuum oven at 120° C. for 10 hours, and then rolled at a pressure of 15 MPa between rollers heated to 80° C. to produce a positive electrode having a final thickness (current collector+active material layer) of 200 μm.

Example 2

Production of Negative Electrode

Process 1: Preparation of Mixed Solution 1.571 g of CMC powder having a weight average molecular weight of 1,200,000 was added to 130.890 g of water, and the substances were mixed using a homo disperser mixer at 70° C. and 2500 rpm for 120 minutes to prepare a dispersion containing CMC.

2.356 g of carbon black as a conductive material was added to a portion (91.623 g) of the dispersion containing CMC, and the substances were mixed using a homo disperser mixer at 2500 rpm for 20 minutes to prepare a conductive material/CMC dispersion.

150 g of artificial graphite (negative electrode active material) having an average particle size (D$_{50}$) of 20 μm and 39.267 g of the remaining CMC were added to the above-described conductive material/CMC dispersion, and the substances were mixed using a planetary mixer at 45 rpm for 40 minutes to prepare a slurry. 7.853 g of an SBR solution (concentration: 40 wt %) and then 101.6 g of water were added to the slurry, and the substances were mixed using a homo disperser mixer at 800 rpm for 20 minutes to prepare a mixed solution (solid content: 40 wt %) including the negative electrode active material, conductive material, CMC, and SBR mixed in a weight ratio of 95.5:1.5:1.0:2.0. In this case, the viscosity of the solution as measured with a Brookfield viscometer was 300 cP (the viscosity was measured using a Brookfield DV2T viscometer equipped with Spindle #63, which is used for measuring a low viscosity, at a constant rpm of 12).

Process 2: Separation of Solution into Layers

The mixed solution prepared through process 1 was allowed to stand for 90 minutes to separate the solution into a lower layer comprising mostly solid ingredients and an upper layer comprising mostly the solvent. In this case, the calculated sedimentation rate of the solid ingredients was 0.30 cm/hr (can be calculated by Equation 1, wherein g=9.8 m/s$^2$, $\rho_p$=2.14×10$^3$ kg/m$^3$, $\rho_s$=1.0×10$^3$ kg/m$^3$, D=15×10$^{-6}$ m, and η=0.3 Pa·s (=300 cP)).

Process 3: Partial Removal of Solvent 96.5 g of the mixed solution separated into upper and lower layers through process 2 was removed from the upper layer comprising mostly the solvent by using a pump to prepare an electrode slurry (solid content: 62.2 wt %). In this case, the electrode slurry had a viscosity of 22,100 cP as measured with a viscometer and an absolute value of a zeta potential of 25.2 mV.

Process 4: Production of Negative Electrode

The electrode slurry prepared through process 3 was applied at a thickness of 130 μm, to a surface of a 20 μm copper thin film as a negative electrode current collector, dried in a vacuum oven at 100° C. for 10 hours, and then rolled at a pressure of 15 MPa between rollers heated to 60° C. to produce a negative electrode having a final thickness (current collector+active material layer) of 150 μm.

Production of Secondary Battery

The positive electrode and negative electrode prepared by the above-described methods and a porous polyethylene separator were assembled by a stacking method, and an electrolytic solution (ethylene carbonate (EC)/ethyl methyl carbonate (EMC)=½ (volume ratio) and lithium hexafluorophosphate (LiPF$_6$; 1 mol)) was injected into the assembled battery to produce a lithium secondary battery.

Comparative Example 1

Production of Positive Electrode

Process 1: Preparation of Electrode Slurry 13.043 g of PVdF powder having a weight average molecular weight of 600,000 was added to 150.0 g of N-methyl-2-pyrrolidone, and the substances were mixed using a homo disperser mixer at 50° C. and 2500 rpm for 90 minutes to prepare a dispersion containing 8 wt % of PVdF.

4.348 g of a carbon black-based conductive material was added to a portion (44.576 g) of the dispersion containing PVdF, and the substances were mixed using a homo disperser mixer at 2500 rpm for 20 minutes to prepare a conductive material/PVdF dispersion.

200 g of a LCO (positive electrode active material) having an average particle size (D$_{50}$) of 15 μm was added to the above-described conductive material/PVdF dispersion, and the substances were mixed using a planetary mixer at 45 rpm for 40 minutes to prepare a slurry. To the slurry, the remainder (118.467 g) of the above-described dispersion containing PVdF was added to prepare a solution (solid content: 59.17%) including the positive electrode active material, conductive material, and PVdF mixed in a weight ratio of 92:2:6. The viscosity of the solution as measured with a Brookfield viscometer was 7200 cP (the viscosity was measured using a Brookfield DV2T viscometer equipped with Spindle #63, which is used for measuring a low viscosity, at a constant rpm of 12).

Process 2: Production of Positive Electrode

The electrode slurry prepared through process 1 was applied at a thickness of 180 μm, to a surface of a 20 μm aluminum thin film as a positive electrode current collector, dried in a vacuum oven at 120° C. for 10 hours, and then rolled at a pressure of 15 MPa between rollers heated to 80° C. to produce a positive electrode having a final thickness (current collector+active material layer) of 200 μm.

Comparative Example 2

Production of Negative Electrode

Process 1: Preparation of Electrode Slurry 1.899 g of CMC powder having a weight average molecular weight of 700,000 was added to 94.937 g of water, and the substances were mixed using a homo disperser mixer at 60° C. and 2500 rpm for 120 minutes to prepare a dispersion containing 2.0 wt % of CMC.

2.373 g of a carbon black-based conductive material was added to a portion (66.456 g) of the dispersion containing CMC, and the substances were mixed using a homo disperser mixer at 2500 rpm for 20 minutes to prepare a conductive material/CMC dispersion.

150 g of artificial graphite (negative electrode active material) having an average particle size ($D_{50}$) of 20 μm and 28.481 g of the remaining CMC were added to the above-described conductive material/CMC dispersion, and the substances were mixed using a planetary mixer at 45 rpm for 40 minutes to prepare a slurry. 7.853 g of an SBR (binder) solution (concentration: 40 wt %) and then 53 g of water were added to the slurry, and the substances were mixed using a homo disperser mixer at 800 rpm for 20 minutes to prepare a mixed solution (solid content: 51.00 wt %) including the negative electrode active material, conductive material, CMC, and SBR mixed in a weight ratio of 94.8:1.5:1.2:2.5. In this case, the viscosity of the solution as measured with a Brookfield viscometer was 5800 cP (the viscosity was measured using a Brookfield DV2T viscometer equipped with Spindle #63, which is used for measuring a low viscosity, at a constant rpm of 12).

Process 2: Production of Negative Electrode

The electrode slurry prepared through process 1 was applied at a thickness of 130 μm, to a surface of a 20 μm copper thin film as a negative electrode current collector, dried in a vacuum oven at 100° C. for 10 hours, and then rolled at a pressure of 15 MPa between rollers heated to 60° C. to produce a negative electrode having a final thickness (current collector+active material layer) of 150 μm.

Production of Secondary Battery

The positive electrode and negative electrode prepared by the above-described methods and a porous polyethylene separator were assembled by a stacking method, and an electrolytic solution (ethylene carbonate (EC)/ethyl methyl carbonate (EMC)=½ (volume ratio) and lithium hexafluorophosphate ($LiPF_6$; 1 mol)) was injected into the assembled battery to produce a lithium secondary battery.

<Experimental Example 1> Measurement of Adhesive Strength

To measure the adhesive strengths within the positive electrodes and negative electrodes produced according to Example 1, 2 and Comparative Example 1, 2, the electrode samples were subjected to a 180° peel test at a rate of 300 mm/min at 50 mm, the results of which are provided in Table 1. Compared to the electrodes of the comparative examples, the electrodes of the examples included a high-molecular-weight binder and had a high solid content and a high slurry viscosity. Therefore, in the electrodes of the examples, the phenomenon that the binder molecules rise to the surface of the electrode during the drying of the electrode is significantly reduced, and thus the adhesive strength between the current collector and the coated layer formed by slurry is significantly increased.

TABLE 1

|  |  | Adhesive strength (gf) |
|---|---|---|
| Example 1 | Positive electrode | 59.14 |
| Example 2 | Negative electrode | 53.83 |
| Comparative Example 1 | Positive electrode | 12.6 |
| Comparative Example 2 | Negative electrode | 19.76 |

<Experimental Example 2> Discharging Characteristics

The positive electrodes produced according to Example 1 and Comparative Example 1 were charged, under a condition of constant current/constant voltage (CC/CV), first with a constant current (CC) of 1.0493 mAh and then with a constant voltage (CV) of 4.35 V until a charge current of 0.05246 mAh was reached. Then, the positive electrodes were maintained for 20 minutes and then discharged with a constant current of 0.1 C until a voltage of 3.0 V was reached. The negative electrodes were charged, under a condition of CC/CV, first with a CC of 1.068 mAh and then with a CV of 0.05 V until a charge current of 0.05034 mAh was reached. Then, the negative electrodes were maintained for 20 minutes and then discharged with a constant current of 0.1 C until a voltage of 1.5 V was reached. Afterward, the performance of the electrodes was evaluated while discharging the electrodes with varying increasing currents corresponding to the C-rates listed in Table 2 and Table 3 in which the results (see FIGS. 5 and 6) of the performance evaluation are provided. Since the electrodes of the examples include a high-molecular-weight binder, the binder content thereof can be reduced, and the active material content can be increased, and thus a battery having an increased upper limit of the battery capacity and exhibiting improved rate characteristics can be produced.

TABLE 2

| | Discharging rate (positive electrode) (%) | | | |
|---|---|---|---|---|
| | Capacity at 0.1 C [mAh/g] | Capacity at 0.2 C/ capacity at 0.1 C | Capacity at 0.5 C/ capacity at 0.1 C | Capacity at 1.0 C/ capacity at 0.1 C |
| Example 1 | 161.2 | 99.0 | 94.1 | 71.6 |
| Comparative Example 1 | 167.6 | 98.3 | 74.3 | 42.9 |

TABLE 3

| | Discharging rate (negative electrode) (%) | | | |
|---|---|---|---|---|
| | Capacity at 0.1 C/ [mAh/g] | Capacity at 0.33 C/ capacity at 0.1 C | Capacity at 0.67 C/ capacity at 0.1 C | Capacity at 1.0 C/ capacity at 0.1 C |
| Example 2 | 348.4 | 94.5 | 74.1 | 50.5 |
| Comparative Example 2 | 350.1 | 93.7 | 51.8 | 30.6 |

While the present invention has been described in detail with reference to certain preferred embodiments thereof, it is to be understood that the present invention is not limited to the disclosed embodiments, but, on the contrary, covers various modifications and improvements made by those skilled in the art within the spirit and scope of the present invention as defined by the appended claims.

The invention claimed is:

1. A method of preparing an electrode slurry, which comprises: preparing a mixed solution by mixing a binder, a conductive material, and an active material with a solvent (process 1); separating the mixed solution prepared through process 1 into layers (process 2); and removing a portion of the solvent from the mixed solution of process 2, which has been separated into layers (process 3), to form the electrode slurry,
wherein the electrode slurry formed by the removal of the portion of the solvent in process 3 has a viscosity of 15,000 cP to 30,000 cP.

2. The method according to claim 1, wherein the mixing according to the process 1 is carried out by using a homo mixer.

3. The method according to claim 1, wherein the active material according to the process 1 has an average particle size ($D_{50}$) of 5 μm to 35 μm.

4. The method according to claim 1, wherein the mixed solution according to the process 1 has a viscosity of 100 cP to 500 cP.

5. The method according to claim 1, wherein the separation according to the process 2 is carried out by allowing the mixed solution to stand to induce solid ingredients thereof to settle.

6. The method according to claim 5, wherein the active material among the solid ingredients settles at a rate of 0.04 cm/hr to 4.67 cm/hr during the process 2.

7. The method according to claim 5, wherein the mixed solution is allowed to stand for 30 minutes to 120 minutes.

8. The method according to claim 1, wherein the removal of a portion of the solvent according to the process 3 is carried out using a pump.

9. The method according to claim 1, wherein the process 1 includes: mixing a binder and a solvent (process A); and adding a conductive material and an active material to a solution prepared through the process A, followed by mixing (process B).

10. The method according to claim 9, wherein the process 1 further includes adding an additional solvent after completion of the process B.

11. The method according to claim 9, wherein the active material is a positive electrode active material, the binder is polyvinylidene fluoride, and the solvent is N-methyl-2-pyrrolidone.

12. The method according to claim 1, wherein the process 1 further includes adding a thickener, in addition to the binder, the conductive material, and the active material.

13. The method according to claim 12, wherein the process 1 includes: mixing
a thickener and a solvent (process I); and
adding a conductive material, an active material, and a binder to the mixed solution prepared through the process I, followed by mixing (process II).

14. The method according to claim 13, wherein the process 1 further includes adding an additional solvent after completion of the process II.

15. The method according to claim 13, wherein the active material is a negative electrode active material, the thickener is carboxymethyl cellulose, the binder is styrene-butadiene rubber, and the solvent is water.

16. The method according to claim 15, wherein the styrene-butadiene rubber is used in a form of a solution including the styrene-butadiene rubber dispersed therein.

17. The method according to claim 9, wherein the binder has a weight average molecular weight of 600,000 to 1,000,000.

18. The method according to claim 9, wherein the active material, the conductive material, and the binder are mixed in a weight ratio of 94~99:0.5~2.0:0.5~4.0.

19. The method according to claim 13, wherein the active material, the conductive material, the thickener, and the binder are mixed in a weight ratio of 93~97:0.5~1.5:0.5~1.5:2.0~4.0.

* * * * *